(12) United States Patent
Wu et al.

(10) Patent No.: US 11,700,656 B2
(45) Date of Patent: Jul. 11, 2023

(54) BIDIRECTIONAL SIDELINK RADIO LINK CONTROL BEARERS

(71) Applicant: Apple Inc., Cupertino, CA (US)

(72) Inventors: Zhibin Wu, Los Altos, CA (US); Clive E. Rodgers, Palo Alto, CA (US); Dawei Zhang, Saratoga, CA (US); Fangli Xu, Beijing (CN); Haijing Hu, Beijing (CN); Hong He, Cupertino, CA (US); Longda Xing, San Jose, CA (US); Murtaza A. Shikari, Mountain View, CA (US); Sethuraman Gurumoorthy, San Jose, CA (US); Sree Ram Kodali, Sunnyvale, CA (US); Srinivasan Nimmala, San Jose, CA (US); Srirang A. Lovlekar, Cupertino, CA (US); Vijay Venkataraman, San Jose, CA (US); Yuqin Chen, Shenzhen (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/734,516

(22) PCT Filed: Nov. 4, 2019

(86) PCT No.: PCT/CN2019/115315
§ 371 (c)(1),
(2) Date: Dec. 2, 2020

(87) PCT Pub. No.: WO2021/087660
PCT Pub. Date: May 14, 2021

(65) Prior Publication Data
US 2021/0368565 A1 Nov. 25, 2021

(51) Int. Cl.
*H04W 76/15* (2018.01)
*H04W 76/18* (2018.01)
*H04W 76/14* (2018.01)

(52) U.S. Cl.
CPC .......... *H04W 76/15* (2018.02); *H04W 76/14* (2018.02); *H04W 76/18* (2018.02)

(58) Field of Classification Search
CPC ..... H04W 76/15; H04W 76/14; H04W 76/18; H04W 76/11; H04L 1/1851; H04L 1/1883; H04L 5/0044; H04L 5/0055
See application file for complete search history.

(56) References Cited

U.S. PATENT DOCUMENTS

| | | | |
|---|---|---|---|
| 11,071,006 B1* | 7/2021 | Pan | H04W 72/087 |
| 2018/0070252 A1* | 3/2018 | Gupta | H04W 74/0808 |

(Continued)

FOREIGN PATENT DOCUMENTS

| | | |
|---|---|---|
| EP | 3742832 A1 | 11/2020 |
| WO | 2019061180 A1 | 4/2019 |

OTHER PUBLICATIONS

International Search Report and Written Opinion for Application No. PCT/CN2019/115315, dated Nov. 4, 2019; 9 pages.

(Continued)

*Primary Examiner* — Habte Mered
(74) *Attorney, Agent, or Firm* — Kowert, Hood, Munyon, Rankin & Goetzel, P.C.

(57) ABSTRACT

Peer devices may wirelessly communicate with each other over a bidirectional sidelink logical channel (LCH) through an established bidirectional sidelink radio bearer. An initiating device of the peer devices may dynamically select a logical channel ID for establishing a fully bidirectional or semi-bidirectional SLRB. At least two alternative sidelink radio resource control (PC5-RRC) procedures may ensure (Continued)

the SLRB parameters are configured correctly in the established logical channel. The procedures also allow the network to configure a limited SLRB which is used to couple the SLRB configuration in the direction in which limited traffic (e.g. feedback information such as robust header compression feedback and/or status reports) is transmitted.

20 Claims, 9 Drawing Sheets

(56) References Cited

U.S. PATENT DOCUMENTS

| | | | | |
|---|---|---|---|---|
| 2020/0245394 A1* | 7/2020 | Wu | | H04W 4/40 |
| 2020/0351975 A1* | 11/2020 | Tseng | | H04W 76/27 |
| 2020/0413467 A1* | 12/2020 | Pan | | H04W 76/14 |
| 2021/0136783 A1* | 5/2021 | Fakoorian | | H04W 72/14 |
| 2021/0144791 A1* | 5/2021 | Kang | | H04W 76/14 |
| 2021/0321329 A1* | 10/2021 | Tenny | | H04W 52/0248 |
| 2021/0329510 A1* | 10/2021 | Tseng | | H04W 76/23 |
| 2021/0368372 A1* | 11/2021 | Chen | | H04W 24/08 |

OTHER PUBLICATIONS

Huawei et al. Support of RLC AM for Sidelink unicast; RC-1913713 2GPP TST-RAN WG2 meeting #107bis; Oct. 18, 2019.

ZTE Corporation et al. Considerations on sidelink RLC, RD-1912384 3GPP TSG-RAN WG2 Meeting#107bis; Oct. 18, 2020.

Spreadtrum Communications Discussion on SLRB Configuration Alignment, R2-1912231 3GPP TSG-RAN WG2 Meeting#107bis Oct. 18, 2019.

CATT Configuration Procedure of the Bi-directional RLC AM SLRB, R2-1912171 3GPP TSG-RAN WG2 Meeting#107bis; Oct. 18, 2019.

Extended European Search Report for EP Patent Application No. 19929191.5; dated Nov. 12, 2021.

Ericsson "Summary of [106#82] RLC email discussion"; 3GPP TSG-RAN WG2 Meeting #107R2-1910295; Prague, Czech; Aug. 26-30, 2019.

* cited by examiner

| TX and RX (for SL unicast only) Category 1 | TX-only Category 2 | RX-only Category 3 |
|---|---|---|
| TX UE config, need conveyed in PC5-RRC for RX UE if not fixed in RAN2 specification | TX-UE set parameter according to SLRB config | up to RX UE implementation on how to set those parameters |
| SLRB ID<br>LCID<br>Mapped QoS Flow to SLRB<br>RLC mode<br>PDCP SN size<br>MaxCID<br>RLC SN field length<br>HARQ enable/disable<br><br>*The above parameters would be TX-only for groupcast and broadcast<br><br>*Cast-type is also part of the SLRB configuration. It is indicated in SIB/pre-configuration for each common SLRB configuration. | DiscardTimer<br>T-PollRetransmit<br>PollPDU<br>PollByte<br>MaxRetx<br>LogicalChannelGroup<br>LCH Priority<br>PrioritizedBitRate<br>BucketSizeDuration<br>ConfiguredGrantType1Allowed<br>SchedulingRequestID<br>LogicalChannelSr-DelayTimerApplied | T-reordering timer<br>OutofOrderDelivery<br>(*FFS need to be conveyed from TX side)<br>T-StatusProhibit<br>T-Reassembly timer |

Parameters may need to be known to both TX and RX for SL unicast

*FIG. 7*

BIDIRECTIONAL SIDELINK RADIO LINK CONTROL BEARERS

PRIORITY CLAIM INFORMATION

This application is a national stage application of International Application No. PCT/CN2019/115315, filed on Nov. 4, 2019, titled "Bidirectional Sidelink Radio Link Control Bearers", which is hereby incorporated by reference in its entirety.

FIELD OF THE INVENTION

The present application relates to wireless communications, and more particularly to the establishment of a bidirectional sidelink radio control bearer for wireless communications, e.g. V2X (vehicle-to-everything) sidelink wireless cellular communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), BLUETOOTH™, etc. A next telecommunications standards moving beyond the current International Mobile Telecommunications-Advanced (IMT-Advanced) Standards is called 5th generation mobile networks or 5th generation wireless systems, referred to as 3GPP NR (otherwise known as 5G-NR for 5G New Radio, also simply referred to as NR). NR proposes a higher capacity for a higher density of mobile broadband users, also supporting device-to-device, ultra-reliable, and massive machine communications, as well as lower latency and lower battery consumption, than current LTE standards.

In general, wireless communication technologies, such as cellular communication technologies, are substantially designed to provide mobile communication capabilities to wireless devices. One proposed use of cellular communications is in vehicular applications, particularly in V2X (vehicle-to-everything) communications. V2X systems allow for communication between vehicles (e.g., communications devices housed in or otherwise carried by vehicles), pedestrian UEs (including UEs carried by cyclists), etc., in order to coordinate traffic activity, facilitate autonomous driving, and perform collision avoidance, among other purposes. UEs in V2X systems widely use sidelink communications which represent a special kind of cellular wireless communication mechanism between devices that is not carried through a base station, e.g. through eNB/gNB. In network assisted Sidelink (SL) resource allocation, a base station (NB) allocates SL resources to the UEs for SL communications to be carried out by the UEs. In this mode of communication, the UEs transmit and receive data/information over the Uu interface link (an interface between the UE and the base station) and also transmit and receive data on SL channel(s) to/from other UE(s). In addition, UEs may also use other communication protocols like Wi-Fi on overlapping or adjacent frequency bands in relation to the carrier for SL communications. In the Uu interface, the radio link control (RLC) configuration of radio bearers (RBs) is provided by the network (e.g. gNB for NR) for both uplink and downlink. In the SL interface, the configuration is assumed be preconfigured or provided by a respective servicing base station (e.g. gNB) for each UE. Therefore, the sidelink RB configurations in peer UEs may be incompatible.

Other corresponding issues related to the prior art will become apparent to one skilled in the art after comparing such prior art with the disclosed embodiments as described herein.

SUMMARY OF THE INVENTION

Embodiments are presented herein of, inter alia, of methods and procedures for support in various devices, e.g. wireless communication devices, to establish bidirectional sidelink radio link control bearers in peer devices, e.g. for V2X (vehicle-to-everything) wireless cellular communications such as 3GPP LTE V2X and/or 5G-NR V2X communications. Embodiments are further presented herein for wireless communication systems containing wireless communication devices (UEs) and/or base stations and access points (APs) communicating with each other within the wireless communication systems.

The peer-to-peer nature of sidelink communication introduces some unique problems in wireless communications. Instead of allowing a master node (e.g., gNB) to control radio link control (RLC) mode configurations in both directions, sidelink UEs need to resolve the potentially conflicting sidelink radio bearer (SLRB) configurations (e.g., LCID, RLC mode) used in the same logical channel. In some embodiments, to address this issue, a UE may operate to dynamically select an LCD. At least two alternative PC5-RRC procedures may ensure the sidelink RB parameters are configured correctly in the established logical channel. The procedures also allow the network to configure a limited SLRB which is used to couple the SLRB configuration in the direction in which limited traffic (e.g. ROHC feedback or SR) is transmitted.

Pursuant to the above, a device (e.g. UE1) may establish a bidirectional sidelink radio bearer (SLRB) between the device and a peer device (e.g. UE2), where the bidirectional SLRB corresponds to a single logical channel and the respective values of a first set of parameters associated with the single logical channel are the same for the device and the peer device. Data and feedback information (or feedback packets), such as status reports and/or ROHC feedback, may be transmitted between the device and the peer device over the single bidirectional logical channel. To establish the single bidirectional SLRB, the device may specify respective values for one or more parameters that include a logical channel identification identifying the single bidirectional logical channel, an SLRB identification identifying the bidirectional SLRB, and/or an acknowledged mode or unacknowledged mode. The device may configure the peer device with the specified values via sidelink radio resource control signaling.

In some embodiments, the device may also wirelessly communicate with the peer device over a second bidirectional logical channel, transmitting data to the peer device over the single bidirectional logical channel and receiving feedback information from the peer device over the single bidirectional logical channel, and receiving data from the peer device over the second bidirectional logical channel and transmitting feedback information to the peer device over the second bidirectional logical channel. In some embodiments, the device may transmit data and feedback information to the peer device over the single bidirectional logical channel, and may also receive data and feedback information from the peer device over the single bidirectional logical channel.

The device may receive the respective values of at least a subset of the first set of parameters from a serving base station, and transmit information indicative of those respective parameter values to the peer device to configure the peer device. In some embodiments, the device may also receive, from a serving base station, respective values of a second set of parameters associated with the single bidirectional logical channel. To establish the bidirectional SLRB, the device may transmit the respective values of a subset of the second set of parameters to the peer device, where the subset of the second set of parameters are associated with transmission of a status report and/or ROHC feedback by the peer device to the device over the single logical bidirectional channel. Alternately, the peer device may receive those respective parameter values from its own serving base station (e.g. a base station serving the peer device), in which case the peer device may provide information indicative of those parameter values to the device.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIG. 7 shows an exemplary table of sidelink radio bearer configuration parameters;

Figure 1:
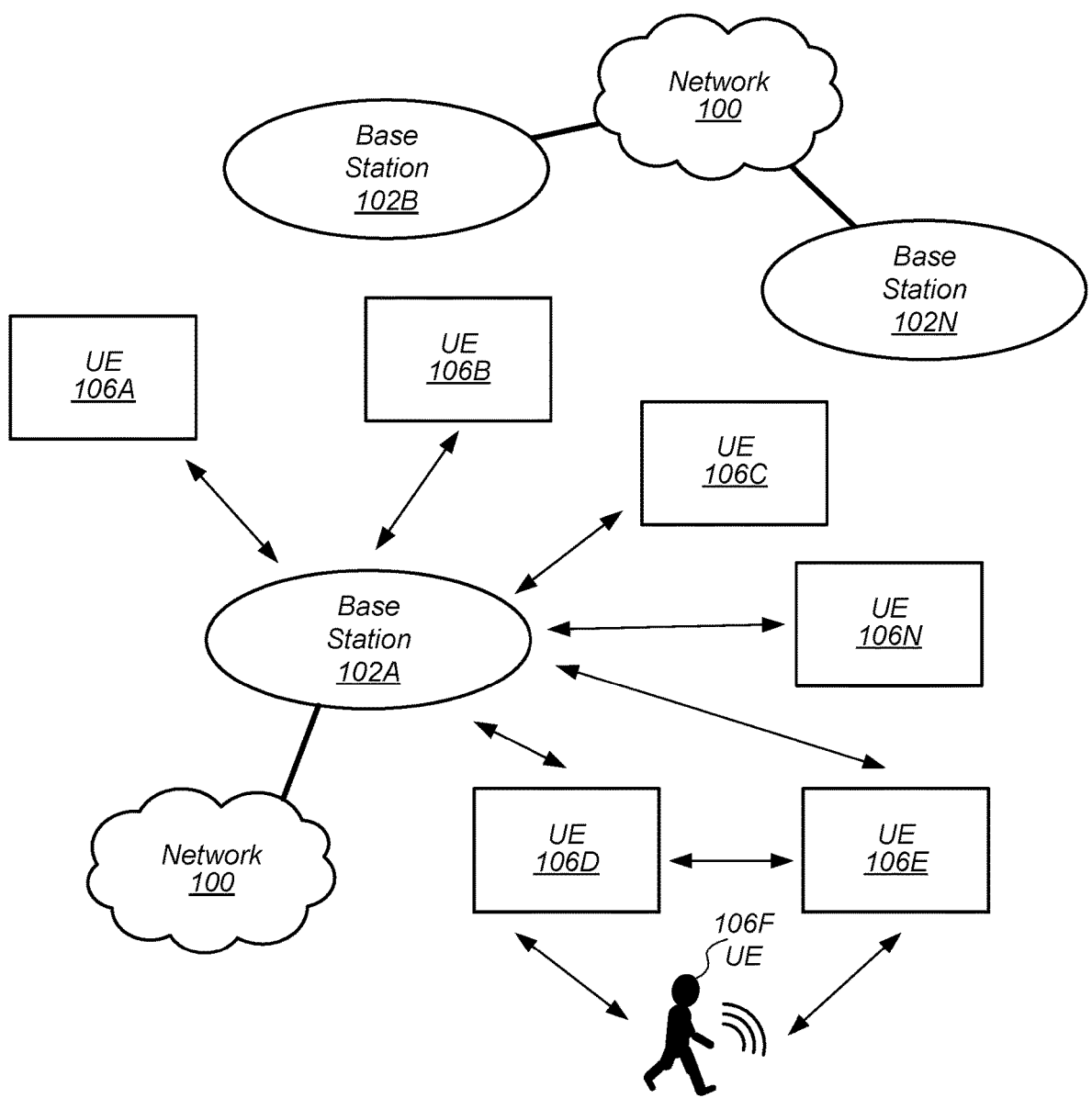
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

AM: Acknowledged Mode
AMR: Adaptive Multi-Rate
AP: Access Point
APN: Access Point Name
APR: Applications Processor
AS: Access Stratum
ASN.1: Abstract Syntax Notation
BS: Base Station
BSR: Buffer Size Report
BSSID: Basic Service Set Identifier
CBRS: Citizens Broadband Radio Service
CBSD: Citizens Broadband Radio Service Device
CCA: Clear Channel Assessment
CID: Connection Identification (ID)
CMR: Change Mode Request
CS: Circuit Switched
DL: Downlink (from BS to UE)
DSDS: Dual SIM Dual Standby
DST: Destination
DYN: Dynamic
EDCF: Enhanced Distributed Coordination Function
FDD: Frequency Division Duplexing
FDM: Frequency Division Multiplexing
FO: First-Order state
FT: Frame Type
GAA: General Authorized Access
GPRS: General Packet Radio Service
GSM: Global System for Mobile Communication
GTP: GPRS Tunneling Protocol
HARQ: Hybrid Automatic Repeat Request
IMS: Internet Protocol Multimedia Subsystem
IP: Internet Protocol
IR: Initialization and Refresh state
KPI: Key Performance Indicator LAN: Local Area Network
LBT: Listen Before Talk
LCH: Logic Channel
LCID: Logic(al) Channel ID
LQM: Link Quality Metric
LTE: Long Term Evolution
MNO: Mobile Network Operator
NAS: Non-Access Stratum
NB: Narrowband
OOS: Out of Sync
PAL: Priority Access Licensee
PC5 link: Sidelink
PDCP: Packet Data Convergence Protocol
PDN: Packet Data Network
PDU: Protocol Data Unit
PGW: PDN Gateway
PLMN: Public Land Mobile Network
PSD: Power Spectral Density
PSS: Primary Synchronization Signal
PSCCH: Physical Sidelink Control Channel
PT: Payload Type
QBSS: Quality of Service Enhanced Basic Service Set
QI: Quality Indicator
RAN: Radio Access Network
RB: Radio Bearer
RAT: Radio Access Technology
RF: Radio Frequency
ROHC: Robust Header Compression
RRC: Radio Resource Control
RTP: Real-time Transport Protocol
RTT: Round Trip Time
RV: Redundancy Version
RX: Reception/Receive
SAS: Spectrum Allocation Server
SI: System Information
SIB: System Information Block
SID: System Identification Number
SIM: Subscriber Identity Module
SGW: Serving Gateway
SL: Sidelink
SLRB: Sidelink Radio Bearer
SMB: Small/Medium Business
SN: Sequence Number
SR: Status Report
SRC: Source
SSS: Secondary Synchronization Signal
TBS: Transport Block Size
TCP: Transmission Control Protocol
TDD: Time Division Duplexing
TDM: Time Division Multiplexing
TX: Transmission/Transmit
UE: User Equipment
UI: User Interface
UL: Uplink (from UE to BS)
UM: Unacknowledged Mode
UMTS: Universal Mobile Telecommunication System
USIM: UMTS Subscriber Identity Module
WB: Wideband
Wi-Fi: Wireless Local Area Network (WLAN) RAT based on the Institute of Electrical and Electronics Engineers' (IEEE) 802.11 standards
WLAN: Wireless LAN Terms The following is a glossary of terms that may appear in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which perform wireless communications. Also referred to as wireless communication devices, many of which may be mobile and/or portable. Examples of UE devices include mobile telephones or smart phones (e.g., iPhone™, Android™-based phones) and tablet computers such as iPad™, Samsung Galaxy™, etc., gaming devices (e.g. Sony Play Station™, Microsoft XBox™, etc.), portable gaming devices (e.g., Nintendo DS™, PlayStation Portable™, Gameboy Advance™, iPod™), laptops, wearable devices (e.g. Apple Watch™, Google Glass™), PDAs, portable Internet devices, music players, data storage devices, or other handheld devices, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wireless communication and may also be portable/mobile.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processor—refers to various elements (e.g. circuits) or combinations of elements that are capable of performing a function in a device, e.g. in a user equipment device or in a cellular network device. Processors may include, for example: general purpose processors and associated memory, portions or circuits of individual processor cores, entire processor cores or processing circuit cores, processing circuit arrays or processor arrays, circuits such as ASICs (Application Specific Integrated Circuits), programmable hardware elements such as a field programmable gate array (FPGA), as well as any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 MHz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
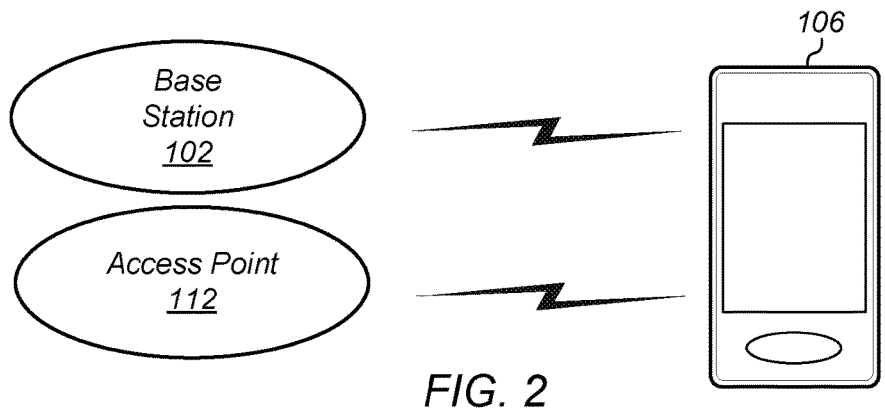
FIG. 2 illustrates an exemplary base station in communication with an exemplary wireless user equipment (UE) device, according to some embodiments.

FIGS. 1 and 2—Exemplary Communication Systems

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes base stations 102A through 102N, also collectively referred to as base station(s) 102 or base station 102. As shown in FIG. 1, base station 102A communicates over a transmission medium with one or more user devices 106A through 106N. Each of the user devices may be referred to herein as a "user equipment" (UE) or UE device. Thus, the user devices 106A through 106N are referred to as UEs or UE devices, and are also collectively referred to as UE(s) 106 or UE106. Various ones of the UE devices may operate with established bidirectional sidelink radio link control (RLC) bearers, e.g. for V2X (vehicle-to-everything) wireless cellular communications, according to various embodiments disclosed herein.

The base station 102A may be a base transceiver station (BTS) or cell site, and may include hardware that enables wireless communication with the UEs 106A through 106N. The base station 102A may also be equipped to communicate with a network 100, e.g., a core network of a cellular service provider, a telecommunication network such as a public switched telephone network (PSTN), and/or the Internet, neutral host or various CBRS (Citizens Broadband Radio Service) deployments, among various possibilities. Thus, the base station 102A may facilitate communication between the user devices and/or between the user devices and the network 100. In particular, the cellular base station 102A may provide UEs 106 with various telecommunication capabilities, such as voice, SMS and/or data services. The communication area (or coverage area) of the base station may be referred to as a "cell." It should also be noted that "cell" may also refer to a logical identity for a given coverage area at a given frequency. In general, any independent cellular wireless coverage area may be referred to as a "cell". In such cases a base station may be situated at particular confluences of three cells. The base station, in this uniform topology, may serve three 120 degree beam width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads). As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network, and may further also be considered at least a part of the UE communicating on the network or over the network.

The base station(s) 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G-NR (NR, for short), 3GPP2 CDMA2000 (e.g., 1×RTT, 1×EV-DO, HRPD, eHRPD), Wi-Fi, WiMAX etc. Note that if the base station(s) 102 are implemented in the context of LTE, they may alternately be referred to as an 'eNodeB' or 'eNB'. Note that if the base station 102A is implemented in the context of 5G NR, it may alternately be referred to as 'gNodeB' or 'gNB'. In some embodiments, the base station(s) 102 may communicate with UEs to establish bidirectional RLC bearers, e.g. for V2X wireless cellular communications, as described herein. Depending on a given application or specific considerations, for convenience some of the various different RATs may be functionally grouped according to an overall defining characteristic. For example, all cellular RATs may be collectively considered as representative of a first (form/type of) RAT, while Wi-Fi communications may be considered as representative of a second RAT. In other cases, individual cellular RATs may be considered individually as different RATs. For example, when differentiating between cellular communications and Wi-Fi communications, "first RAT" may collectively refer to all cellular RATs under consideration, while "second RAT" may refer to Wi-Fi. Similarly, when applicable, different forms of Wi-Fi communications (e.g. over 2.4 GHz vs. over 5 GHz) may be considered as corresponding to different RATs. Furthermore, cellular communications performed according to a given RAT (e.g. LTE or NR) may be differentiated from each other on the basis of the frequency spectrum in which those communications are conducted. For example, LTE or NR communications may be performed over a primary licensed spectrum as well as over a secondary spectrum such as an unlicensed spectrum and/or spectrum that was assigned to Citizens Broadband Radio Service (CBRS). Overall, the use of various terms and expressions will always be clearly indicated with respect to and within the context of the various applications/embodiments under consideration.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services. Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-106N as illustrated in FIG. 1, each one of UE(s) 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-102B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

As mentioned above, UE(s) 106 may be capable of communicating using multiple wireless communication standards. For example, a UE might be configured to communicate using any or all of a 3GPP cellular communication standard (such as LTE or NR) or a 3GPP2 cellular communication standard (such as a cellular communication standard in the CDMA2000 family of cellular communication standards). Base station(s) 102 and other similar base stations operating according to the same or a different cellular communication standard may thus be provided as one or more networks of cells, which may provide continuous or nearly continuous overlapping service to UE106 and similar devices over a wide geographic area via one or more cellular communication standards.

The UE106 might also or alternatively be configured to communicate using WLAN, BLUETOOTH™, BLUETOOTH™ Low-Energy, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible. Furthermore, UE(s) 106 may also communicate with Network 100, through one or more base stations or through other devices, stations, or any appliances not explicitly shown but considered to be part of Network 100. UE(s) 106 communicating with a network may therefore be interpreted as the UE(s) 106 communicating with one or more network nodes considered to be a part of the network and which may interact with the UE(s) 106 to conduct communications with the UE(s) 106 and in some cases affect at least some of the communication parameters and/or use of communication resources of the UE(s) 106.

Furthermore, as also illustrated in FIG. 1, at least some of the UEs, e.g. UEs 106D and 106E may represent vehicles communicating with each other and with base station 102, e.g. via cellular communications such as 3GPP LTE and/or 5G-NR communications, for example. In addition, UE106F may represent a pedestrian who is communicating and/or interacting with the vehicles represented by UEs 106D and 106E in a similar manner. Further aspects of vehicles communicating in network exemplified in FIG. 1 will be discussed below, for example in the context of vehicle-to-everything (V2X) communication such as the communications specified by 3GPP TS 22.185 V 14.3.0, among others.

FIG. 2 illustrates an exemplary user equipment 106 (e.g., one of the devices 106A through 106N) in communication with the base station 102 and an access point 112, according to some embodiments. The UE106 may be a device with both cellular communication capability and non-cellular communication capability (e.g., BLUETOOTH™, Wi-Fi, and so forth) such as a mobile phone, a hand-held device, a computer or a tablet, or virtually any type of wireless device. The UE106 may include a processor that is configured to execute program instructions stored in memory. The UE106 may perform any of the method embodiments described herein by executing such stored instructions. Alternatively, or in addition, the UE106 may include a programmable hardware element such as an FPGA (field-programmable gate array) that is configured to perform any of the method embodiments described herein, or any portion of any of the method embodiments described herein. The UE106 may be configured to communicate using any of multiple wireless communication protocols. For example, the UE106 may be configured to communicate using two or more of CDMA2000, LTE, LTE-A, NR, WLAN, or GNSS. Other combinations of wireless communication standards are also possible.

The UE106 may include one or more antennas for communicating using one or more wireless communication protocols according to one or more RAT standards, e.g. those previously mentioned above. In some embodiments, the UE106 may share one or more parts of a receive chain and/or transmit chain between multiple wireless communication standards. The shared radio may include a single antenna, or may include multiple antennas (e.g., for MIMO) for performing wireless communications. Alternatively, the UE106 may include separate transmit and/or receive chains (e.g., including separate antennas and other radio components) for each wireless communication protocol with which it is configured to communicate. As another alternative, the UE106 may include one or more radios or radio circuitry which are shared between multiple wireless communication protocols, and one or more radios which are used exclusively by a single wireless communication protocol. For example, the UE106 may include a shared radio for communicating using either of LTE or CDMA2000 1×RTT or NR, and separate radios for communicating using each of Wi-Fi and BLUETOOTH™. Other configurations are also possible.

Figure 3:
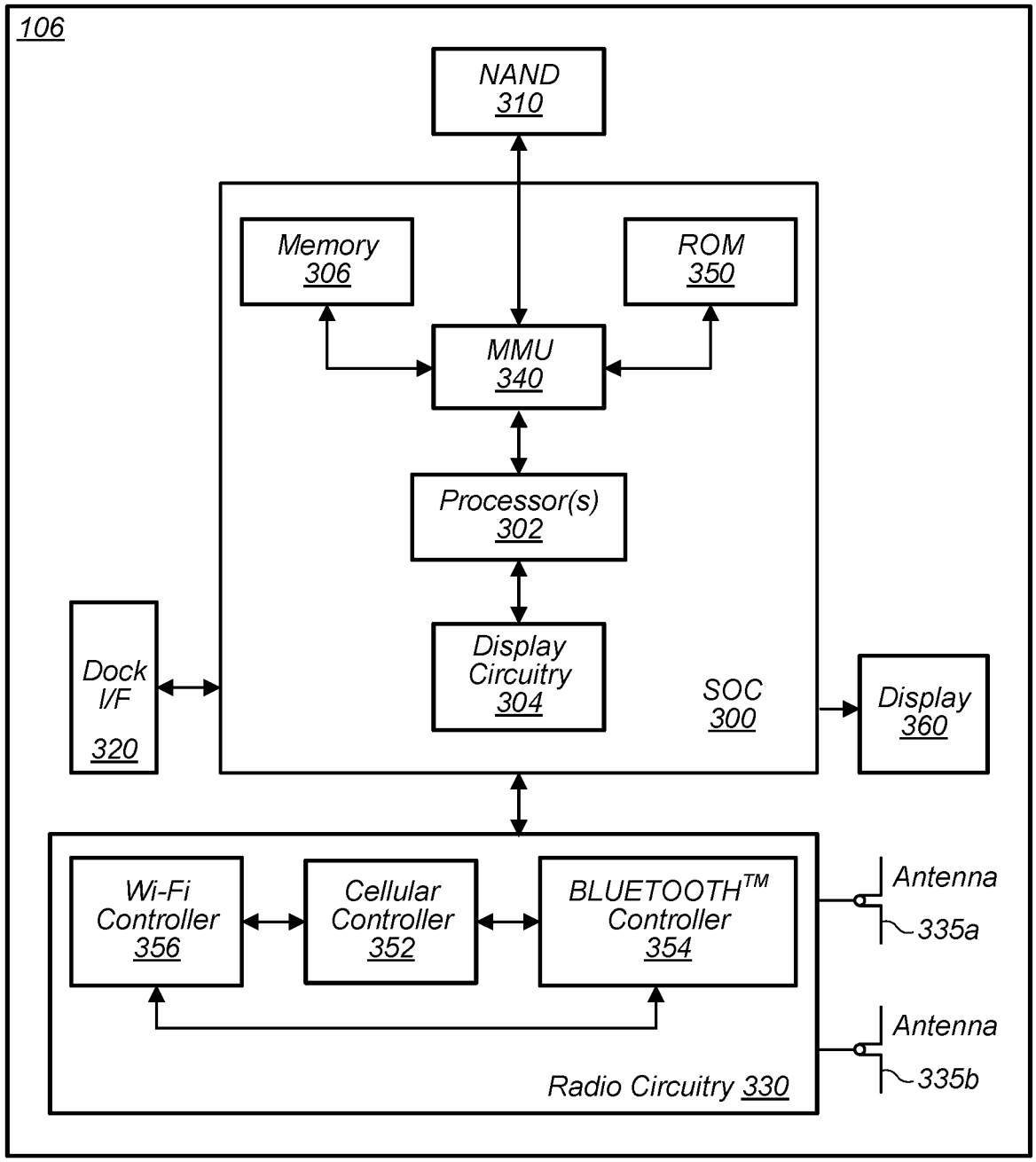
FIG. 3 shows an exemplary block diagram of a UE, according to some embodiments.

FIG. 3—Exemplary UE

FIG. 3 illustrates a block diagram of an exemplary UE106, according to some embodiments. As shown, the UE106 may include a system on chip (SOC) 300, which may include portions for various purposes. For example, as shown, the SOC 300 may include processor(s) 302 which may execute program instructions for the UE106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE106. For example, the UE106 may include various types of memory (e.g., including NAND flash 310), a connector interface 320 (e.g., for coupling to the computer system), the display 360, and wireless communication circuitry (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

As further described herein, the UE106 (and/or base station 102) may include hardware and software components for implementing methods for at least UE106 to communicate with other UEs using bidirectional RLC bearers, e.g. for V2X wireless cellular communications, as further detailed herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to establish and/or communicate using bidirectional RLC bearers, e.g. for V2X wireless cellular communications, according to various embodiments disclosed herein. Processor(s) 302 may also implement various other applications and/or end-user applications running on UE106.

Figure 5:
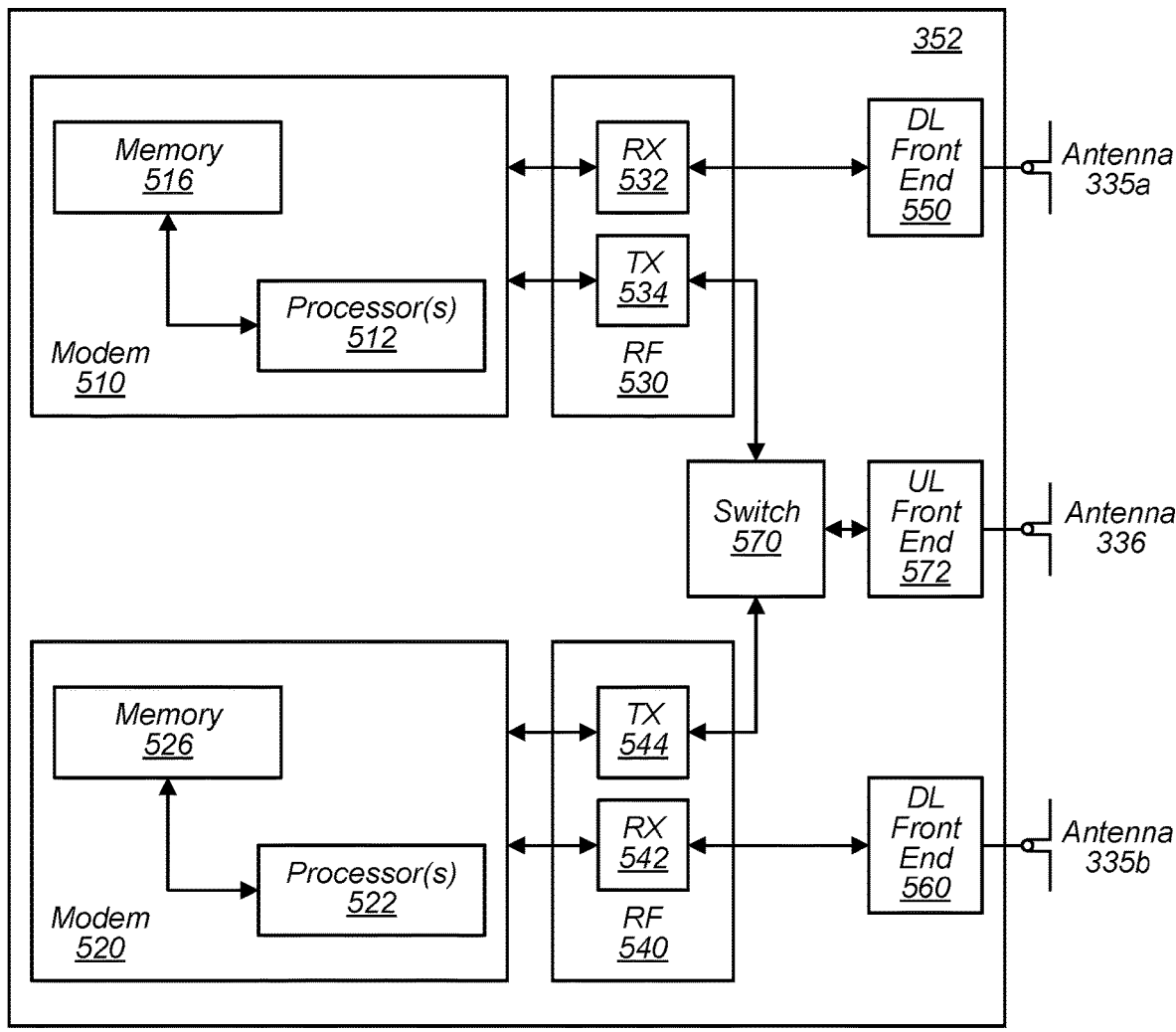
FIG. 5 shows an exemplary simplified block diagram illustrative of cellular communication circuitry, according to some embodiments.

In some embodiments, radio circuitry 330 may include separate controllers dedicated to controlling communications for various respective RAT standards. For example, as shown in FIG. 3, radio circuitry 330 may include a Wi-Fi controller 356, a cellular controller (e.g. LTE and/or NR controller) 352, and BLUETOOTH™ controller 354, and in at least some embodiments, one or more or all of these controllers may be implemented as respective integrated circuits (ICs or chips, for short) in communication with each other and with SOC 300 (and more specifically with processor(s) 302). For example, Wi-Fi controller 356 may communicate with cellular controller 352 over a cell-ISM link or WCI interface, and/or BLUETOOTH™ controller 354 may communicate with cellular controller 352 over a cell-ISM link, etc. While three separate controllers are illustrated within radio circuitry 330, other embodiments have fewer or more similar controllers for various different RATs that may be implemented in UE device 106. For example, at least one exemplary block diagram illustrative of some embodiments of cellular controller 352 is shown in FIG. 5 as further described below.

Figure 4:
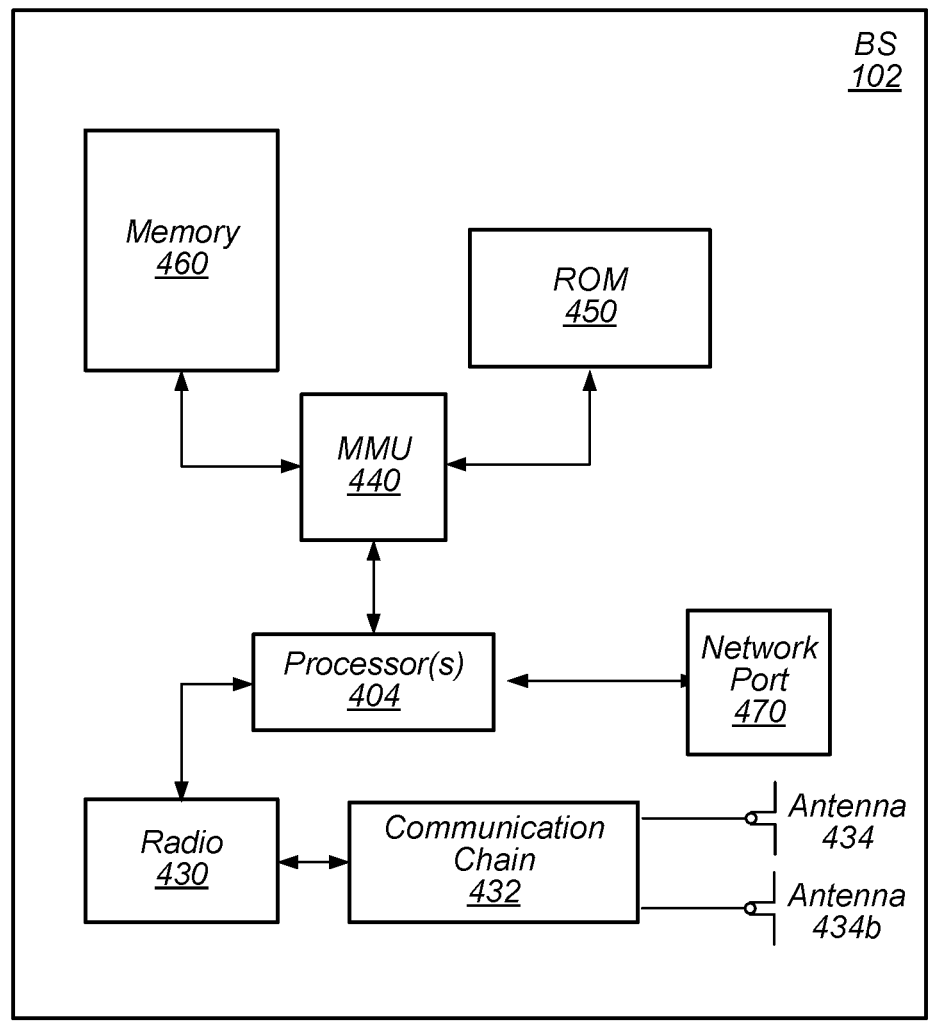
FIG. 4 shows an exemplary block diagram of a base station, according to some embodiments.

FIG. 4—Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas, (e.g. illustrated by antennas 434a and 434b) for performing wireless communication with mobile devices and/or other devices. Antennas 434a and 434b are shown by way of example, and base station 102 may include fewer or more antennas. Overall, the one or more antennas are collectively referred to as antenna(s) 434. Antenna(s) 434 may be configured to operate as a wireless transceiver and may be further configured to communicate with UE devices 106 via radio circuitry 430. The antenna 434 communicates with the radio 430 via communication chain 432. Communication chain 432 may be a receive chain, a transmit chain or both. The radio circuitry 430 may be designed to communicate via various wireless telecommunication standards, including, but not limited to, LTE, LTE-A, 5G-NR (or NR for short), WCDMA, CDMA2000, etc. The processor(s) 404 of the base station 102 may be configured to implement part or all of the methods described herein, e.g., by executing program instructions stored on a memory medium (e.g., a non-transitory computer-readable memory medium), for base station 102 to communicate with a UE device that may communicate with other UEs using bidirectional RLC bearers, e.g. for V2X wireless cellular communications. Alternatively, the processor(s) 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard.

Base station 102 may operate according to the various methods and embodiments as disclosed herein for communicating with UE devices that communicate with other UE devices using bidirectional RLC bearers, e.g. for V2X wireless cellular communications, as disclosed herein.

FIG. 5—Exemplary Cellular Communication Circuitry

FIG. 5 illustrates an exemplary simplified block diagram illustrative of cellular controller 352, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 352 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 352 may couple (e.g., communicatively; directly or indirectly) to one or more antennas, such as antennas 335*a-b* and 336 as shown. In some embodiments, cellular communication circuitry 352 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 352 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 352 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 352 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 352 may include only one transmit/receive chain. For example, the cellular communication circuitry 352 may not include the modem 520, the RF front end 540, the DL front end 560, and/or the antenna 335*b*. As another example, the cellular communication circuitry 352 may not include the modem 510, the RF front end 530, the DL front end 550, and/or the antenna 335*a*. In some embodiments, the cellular communication circuitry 352 may also not include the switch 570, and the RF front end 530 or the RF front end 540 may be in communication, e.g., directly, with the UL front end 572.

Figure 6:
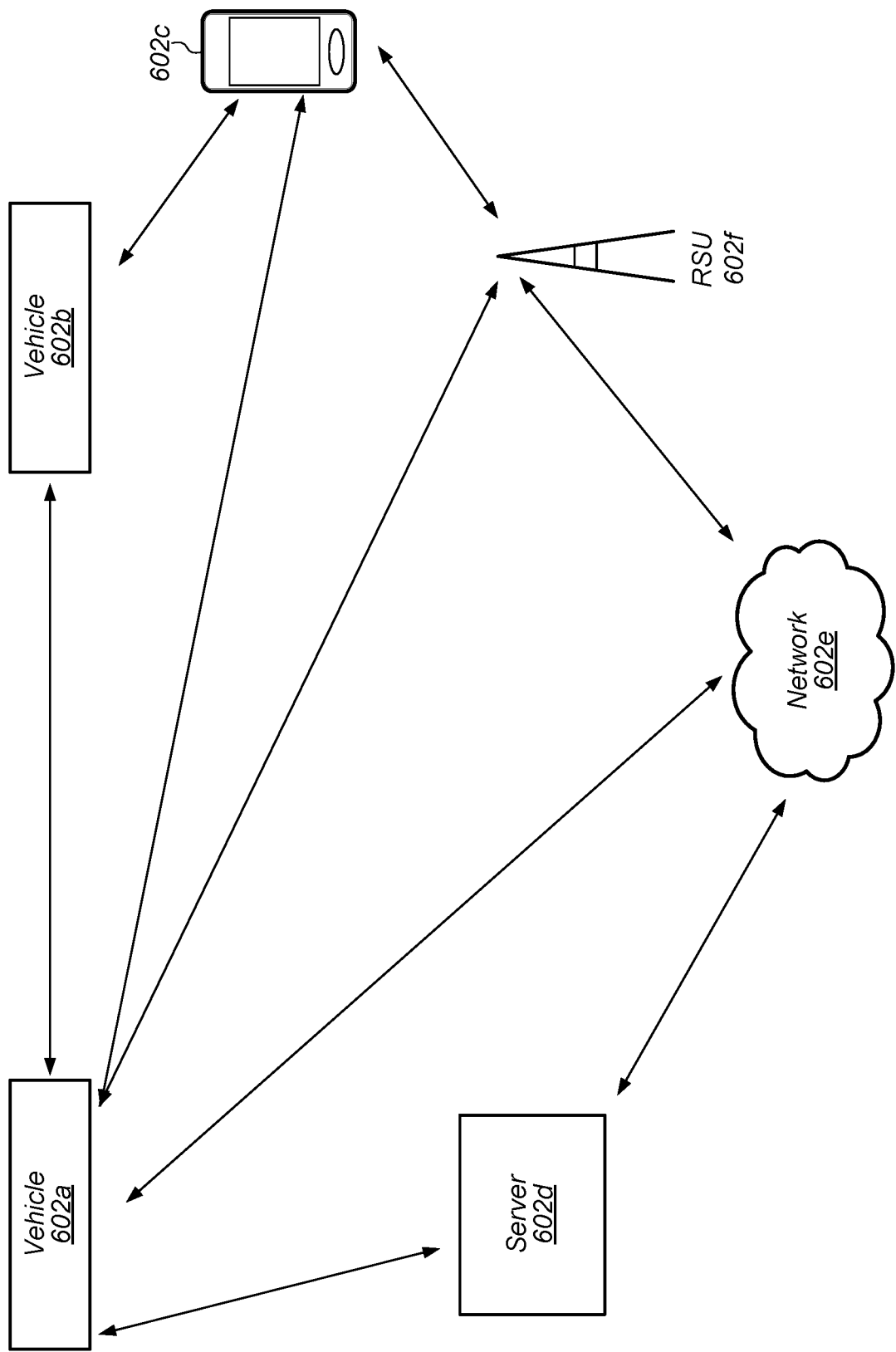
FIG. 6 illustrates an exemplary vehicle-to-everything network.

FIG. 6—Exemplary Vehicle-to-Everything Communications Network

FIG. 6 illustrates an exemplary vehicle-to-everything (V2X) communications network, (e.g., as may be specified by 3GPP TS 22.185 V 14.3.0), which allows for communication between a vehicle (e.g., a mobile unit within a vehicle, such as a wireless device incorporated into the vehicle or currently contained within the vehicle and/or another transmitter contained in or otherwise incorporated within the vehicle) and other vehicles and/or various wireless devices. In general, V2X communication systems are considered networks in which vehicles, UEs, and other network entities exchange communications in order to coordinate traffic activity, among other possible purposes. V2X communications include communications conveyed between a vehicle (e.g., a wireless device or communication device constituting part of the vehicle, or contained in or otherwise born along by the vehicle) and various other devices. V2X communications may include vehicle-to-pedestrian (V2P), vehicle-to-infrastructure (V2I), vehicle-to-network (V2N), and vehicle-to-vehicle (V2V) communications, as well as communications between vehicles and other possible network entities and/or devices. V2X communications may also include communications between UEs and/or other devices for the purpose of sharing V2X information.

As mentioned above, V2X communications may, for example, adhere to 3GPP specifications, and they may also adhere to other subsequent or similar standards whereby vehicles and other network entities may communicate. For example, as illustrated in FIG. 6, a vehicle, such as vehicle 602a may be in communication with various devices (e.g., devices 602b-602f), such as road side units (RSUs) exemplified by 602f, infrastructure (V2I) exemplified by 602d, network (V2N) exemplified by 602e, pedestrian (V2P) exemplified by 602c, and/or other vehicles (V2V) exemplified by 602b. In addition, as shown, all devices within the V2X framework may communicate with other devices. V2X communications may utilize both long range (e.g., cellular) communications as well as short- to medium-range communications (e.g., non-cellular) communications. Cellular-capable V2X communications may be called cellular V2X (C-V2X) communications. C-V2X systems may use various cellular radio access technologies (RATs), such as LTE and/or 5G-NR. In at least some embodiments, at least some cellular communications as well as non-cellular communications may use unlicensed bands as well as a dedicated spectrum at a specified frequency, for example 5.9 GHz. Moreover, V2X communications may include unicast, multicast, and/or broadcast communications.

As noted above, there may be many types of devices participating in a V2X communications system. A V2X system may include vehicles, cellular base stations, roadside units (RSUs), and mobile or portable UE devices that may be carried or worn by pedestrians, i.e., pedestrian UEs (PUEs), such as a mobile handset or smartwatch, among other devices. In at least some embodiments of a V2X system, various devices and entities may communicate with other devices or entities (and not necessarily only with vehicles). It should be noted that as used herein, "user devices" or UE may generally refer to devices that are associated with mobile actors or traffic participants of the V2X system, i.e., mobile (able-to-move) communication devices such as vehicles and PUEs. Conversely, "infrastructure devices" may refer to devices in the V2X system which are not traffic actors (i.e., not pedestrians, vehicles, or other users), such as RSUs and base stations.

Sidelink Communications

In wireless communications, specifically cellular wireless communications, sidelink communications (also referred to as PC5 communications) represent a special kind of communication mechanism between devices that is not carried through a base station, e.g. it is not carried through eNB/gNB. In other words, the devices communicate with each other without the communication requiring facilitation by a base station. In one sense, the devices may be said to be communicating with each other directly. Accommodation of such communication between devices (or between UEs/PUEs) however requires a new physical layer design, albeit with minimal design changes to existing implementations, in order for new designs not to differ substantially from pre-existing designs. Many recent studies have identified the need for technical solutions for sidelink design, e.g. a sidelink design in 5G-NR, to meet the requirements of advanced V2X services, including support of sidelink unicast, sidelink groupcast and sidelink broadcast. A number of specific use cases have been identified for advanced V2X services, categorized into four groups: vehicle platooning, extended sensors, advanced driving, and remote driving. Platooning is a cooperative driving application according to which multiple vehicles travel in the same lane as in a convoy, keeping a specified (preferably constant) inter-vehicle distance between each other in order to increase their traffic efficiency, e.g. to reduce fuel consumption and gas emissions and to achieve safe and efficient transport. As previously mentioned, in network assisted SL resource allocation, a base station (e.g. gNB) may allocate SL resources to the UEs for SL communications to be carried out by the UEs. The UEs may transmit and receive data/information over the Uu interface link (an interface between the UE and the NB) and may also transmit and receive data on SL channel(s) from other UE(s). In addition, UEs may also use other communication protocols such as Wi-Fi on overlapping or adjacent frequency bands in relation to the carrier for SL communications. Accordingly, in the Uu interface, the radio link control (RLC) configuration of radio bearers (RBs) is provided by the network (e.g. gNB for NR) for both uplink and downlink, while in the SL interface, the configuration is assumed be preconfigured or provided by a respective servicing base station (e.g. gNB) for each UE. Therefore, the sidelink RB configurations in peer UEs may be incompatible.

NR V2X Considerations

In order to accomplish effective sidelink communication between peer devices (e.g. between peer UEs or peer vehicles), it is desirable to establish bidirectional Sidelink Radio Bearers (SLRBs), also referred to as logical channels, between the peer devices/UEs, as the transported PDUs (packet data units) in both directions are correlated or correspond to each other. For example, in RLC acknowledged mode (AM), the data transmitted in one direction and the Status Report (SR) transmitted in the opposite direction are related. For RLC unacknowledged mode (UM), the ROHC feedback (a PDCP control PDU) is associated with the PDCP traffic. As previously mentioned, in a Uu interface, the RLC configuration of an RB is provided to the UE by the network for both uplink and downlink, while in the SL interface, the configuration is assumed to have been provided by a respective serving base station (e.g. gNB) for each UE, or it is assumed to be preconfigured. Therefore, the configuration in both peer UEs may be incompatible.

For example, UE1 may choose AM mode for Logical Channel ID (LCID) 1, but UE2 may choose UM mode for LCID 1. However, if the SLRB parameter is already configured by the NW, the UE cannot choose a different parameter configuration (or a different configuration of the parameter) without NW consent. Only a UE in an RRC-connected state is able to request the NW to override the prior configuration with the new compatible parameters. This may result in a problem where for a bidirectional AM SLRB (as well as bidirectional UM SLRB), configurations may be incompatible, e.g., certain parameters such as SN-Size, AM/UM, LCID, etc. may not be compatible.

FIG. 7 shows an exemplary table of sidelink radio bearer configuration parameters. As indicated, certain parameters may need to be known for both transmit and receive for sidelink unicast transmissions. The SLRB configuration in dedicated RRC signaling is destination-specific, different from system information block (SIB) configuration or pre-configuration. Peer devices are expected to share TX/RX parameters among themselves, and a subset of category 1 parameters, referred to as "set 1" parameters (highlighted in FIG. 9 and including SLRB ID, LCID, RLC mode, and PDCP SN size) are to be synced between the UE devices. That is, set 1 parameters may have the same respective values for both UE1 and UE2, as they may need to be the same (or have the same value) in both directions (LCD, UM or AM mode). For example, the value of RLC mode may be the same for UE1 and UE2 for TX and RX, etc. Other parameters may be different in respective directions (e.g. there is no need for category 2 and/or category 3 parameters to be the same, e.g. to have the same values for different peer UEs). For example, the value of Discard Timer may not need to be the same for UE1 and UE2, etc.

Figure 8:
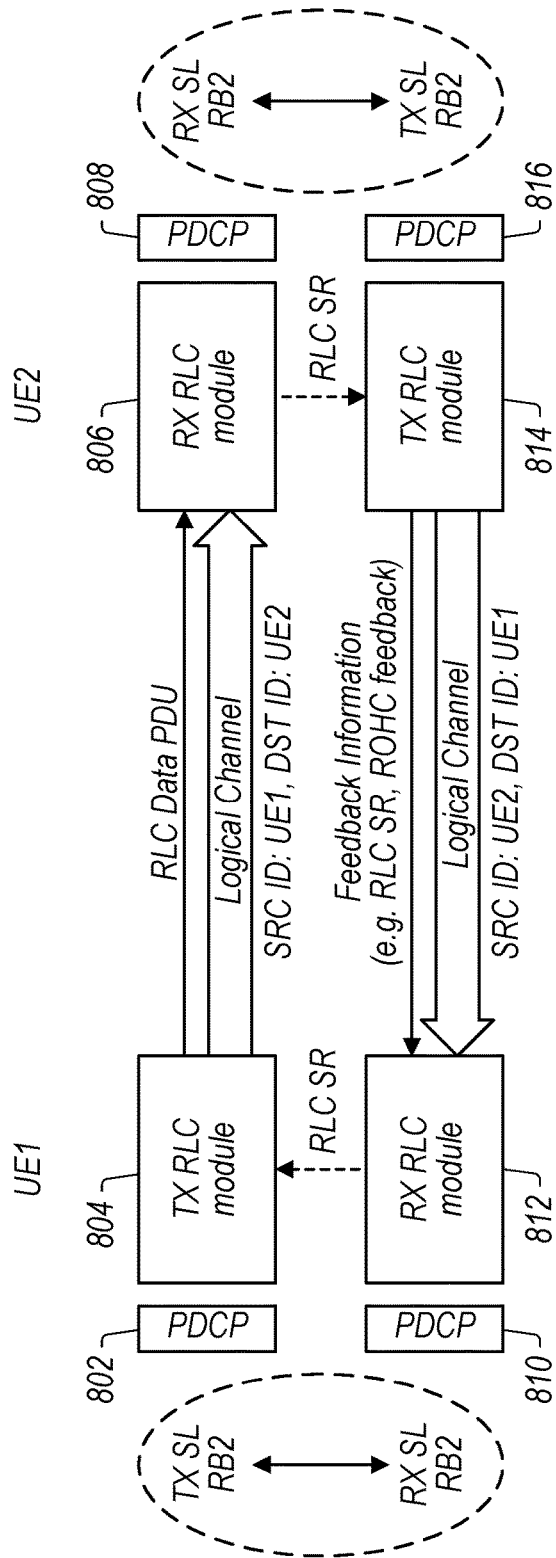
FIG. 8 shows an exemplary block diagram illustrating a unidirectional sidelink logical channel configuration between peer devices.

FIG. 8 shows an exemplary block diagram illustrating a unidirectional sidelink logical channel configuration between peer devices, which requires two different logical channels. As indicated in FIG. 8, RLC data is transmitted in a single direction on one channel, notably by UE1 via TX entity/circuit 804 to UE2, where it is received by RX module/circuit 806, while feedback information or packets (e.g. the RLC status report (SR) and/or ROHC feedback) is transmitted in a single direction on another channel, notably by UE2 via TX module/circuit 814 to UE2, where it is received by RX entity/circuit 812. Accordingly, there are two different unidirectional logical channels established between UE1 and UE2, one for RLC data and one for the feedback information. For the logical channel carrying the RLC data, the source (SRC) is identified as UE1 and the destination (DST) is identified as UE2, while for the logical channel carrying the feedback information, the SRC is identified as UE2 and the DST is identified as UE1. Packets may be generated/decoded by corresponding PDCP modules/circuits 802/810 and 816/808. This approach is limited and may pose certain problems as will be further discussed below.

Figure 9:
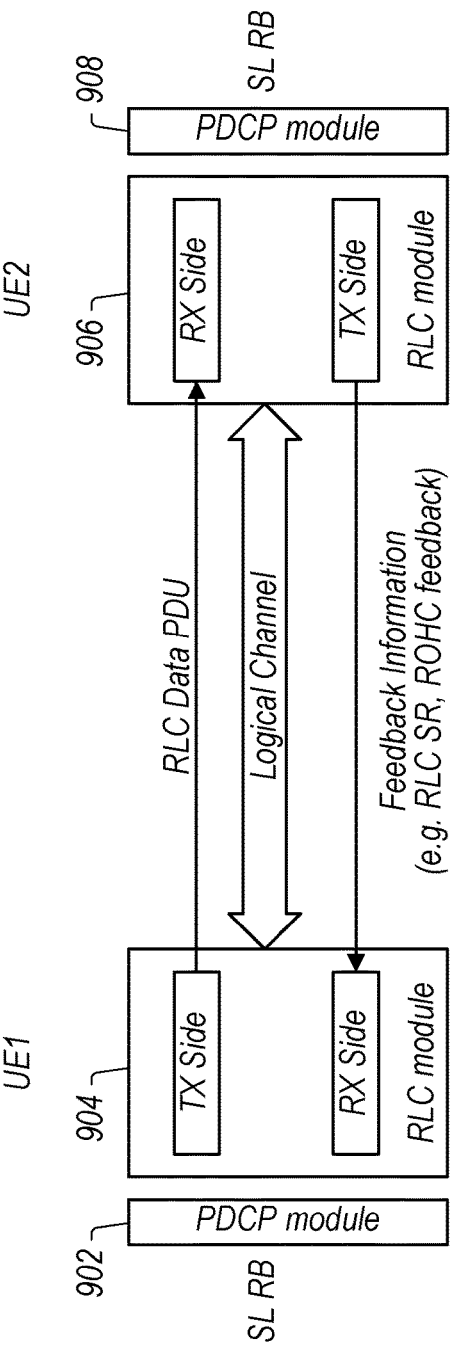
FIG. 9 shows an exemplary block diagram illustrating a bidirectional sidelink logical channel configuration between peer devices, according to some embodiments.

FIG. 9 shows an exemplary block diagram illustrating a bidirectional sidelink logical channel configuration between peer devices, which uses only a single fully bidirectional logical channel. UE1 includes RLC module 904 and PDCP module 902, while UE2 includes RLC module 906 and PDCP module 908. As illustrated, a bidirectional sidelink logical channel is established between UE1 and UE2, over which RLC data may be transmitted from UE1 to UE2 and the feedback information may be transmitted from UE2 to UE1. The advantages of this configuration are further discussed below.

According to the existing standards agreements, the logical channel ID (LCID) is assumed to have already been configured as part of the sidelink radio bearer (SLRB) configuration. Both the SLRB ID and the LCID are configured (independently) by gNB(s) or are pre-configured in the UE. LCID space conflicts are therefore likely to occur. For an RRC-connected UE, one solution is to send a peer request to the gNB for the gNB to make a determination. If the LCID is in conflict, the gNB may reconfigure an LCID to be associated with a new (existing RB) with compatible parameters. There are a number of issues to consider with respect to this scenario. A first issue concerns a UE that may be in an RRC idle state or may be inactive. A second issue concerns options are available for the gNB when the LCID has already been configured/assigned to an SLRB with active traffic. A third issue concerns whether both sides should request the gNB to reconfigure the SLRB for the proposed LCID when both UEs start an SLRB RRC configuration procedure at the same time with the same proposed LCID but incompatible parameters.

RLC Bearer Considerations

Various solutions to the above issues may be considered for the establishment of a bidirectional sidelink radio bearer between peer devices, e.g. between peer UEs. One possibility is to prevent the problem with the operations, administration and maintenance (OAM) through inter-operator coordination to ensure all SLRB configurations are compatible. However, this may prove unrealistic because quality of service (QoS) flows in two directions may not have the same QoS-SLRB mapping. Another possibility is to not give the problem any consideration. In this case, a PC5-RRC procedure failure may be declared if RB configurations are inconsistent. After a first device (e.g. UE2) receives the configuration from a second device (e.g. from UE1) through PC5-RRC configuration, if the first device had previously been configured with an incompatible SLRB, it may automatically fail, and the UEs thereby fail to setup an RB (e.g. no recovery procedure is specified). A compromise may include acknowledging that the configuration may be in conflict but attempt to resolve it either semi-directionally or fully bidirectionally.

Figure 10:
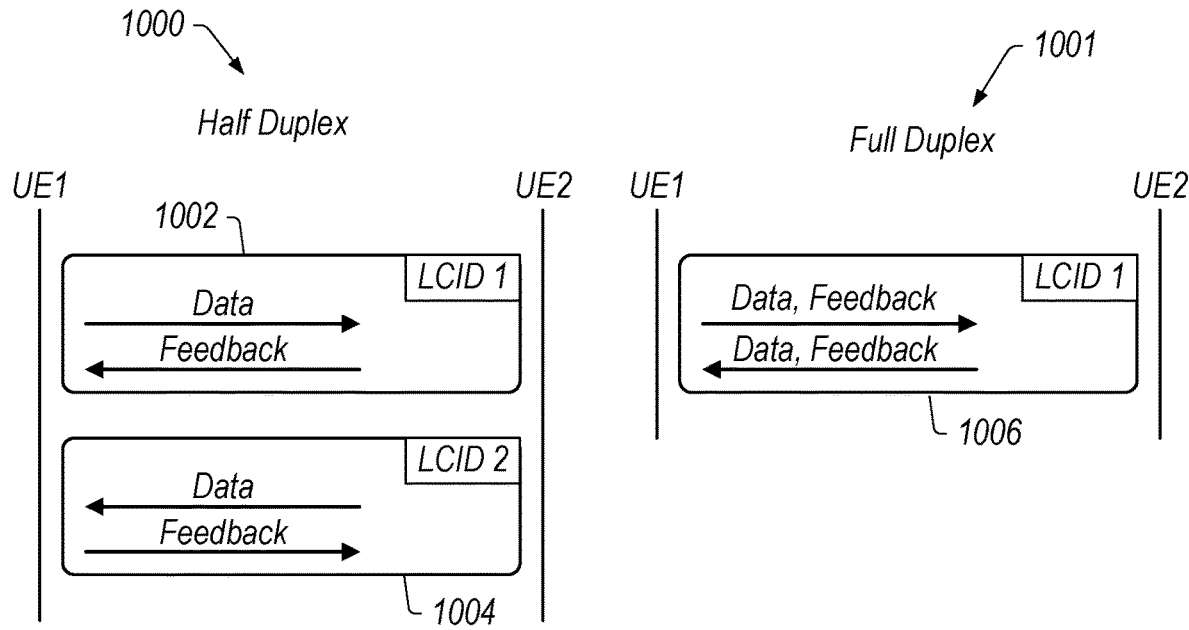
FIG. 10 shows exemplary block diagrams respectively illustrating a full-duplex (fully bidirectional) data configuration and a half-duplex (semi-bidirectional) data configuration, according to some embodiments.

Two types of bidirectional RB support may be considered, semi-bidirectional and fully bidirectional, which are illustrated in FIG. 10. The semi-bidirectional (or half duplex) 1000 configuration includes two different logical channels, each logical channel representing an implementation of the bidirectional logical channel shown in FIG. 8, with data transmitted from UE1 to UE2 and the feedback information transmitted from UE2 to UE1 over logical channel 1002 (LCID 1), and data transmitted from UE2 to UE1 and the feedback information transmitted from UE1 to UE2 over logical channel 1004 (LCID 2). For fully bi-directional (full duplex) configuration 1001, both peer UEs (UE1 and UE2) apply the QoS-to-SLRB mapping to the established bearer because each UE uses the established bearer to transport QoS flows. In other words, data and the feedback information are all transmitted in both directions over the same logical channel 1006 (LCID 1).

RLC Bidirectional Bearer

LCID space is shared per destination, or per source/destination pair(s) for bidirectional RBs. Once reconfiguration through PC5-RRC has been completed, LCID usage for SL unicast between the pair of devices or UEs is known at both devices/UEs, hence LCID collision(s) may be avoided at the discretion of the UE. As long as SLRBs are established sequentially, LCID usage is consistent on both sides. There are however issues that may result in LCID conflicts or problems associated with LCID conflicts. One issue may be an LCID configuration mismatch within SLRB, e.g. when LCID 1 is configured in UE1 for AM, but is configured in UE2 for UM. One possible solution to this problem is to dynamically assign the LCID (and SLRB ID). Another possible solution is to fix the LCID and SLRB ID configurations in the specification. Another issue may be a Ship-in-the-night (SITN) problem, where both UEs establish and setup a bidirectional SLRB with the same LCD, but with incompatible parameters. However, LCID conflict may be largely avoided when the LCID space is dynamically assigned (e.g. not fixed in the SLRB configuration).

Dynamic LCID Selection

Dynamic LCID selection may include the initiating device (e.g. UE1) selecting/choosing the LCID, SLRB ID and UM/AM for the RLC bidirectional bearer, and the peer UE (e.g. UE2) acknowledging these selections via a PC5-RRC procedure. Additional RB parameters used by the peer device (e.g. UE2) for transmissions from UE2 to UE1 for feedback information such as SR and/or for robust header compression (ROHC) feedback may be selected/determined in a variety of ways which will be further discussed below. The additional RB parameters may include category 1 transmit/receive parameters (e.g. maxCID, HARQ enable/disable, RLC SN length), and may further include category 2 transmit-only parameters (e.g. LCH priority, etc). It should be noted that CID refers to the maximum Connection ID corresponding to ROHC connections as defined in the 3GPP specification. It should further be noted that to support normal bearers, the PDCP PDU includes SN in the PDCP header and PDCP SN size is also configured. However, support for transmitting the RLC SR, for example, does not require a PDCP header. Accordingly, no PDCP SN field is included in the ROHC feedback. Therefore, a limited SLRB for coupling purpose may be defined, for which no QoS flow mapping and no PDCP SN size are required.

Figure 11:
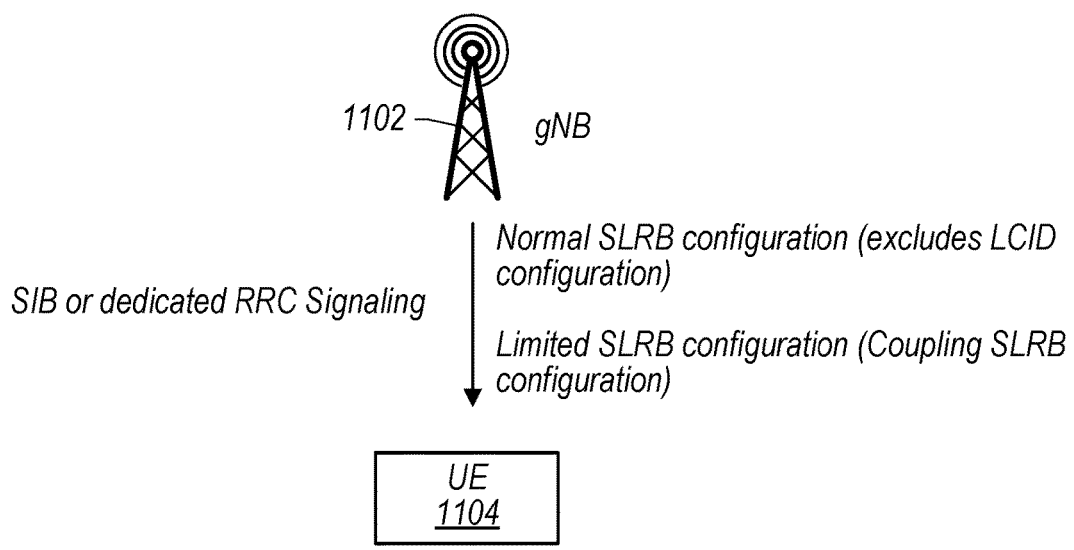
FIG. 11 shows an exemplary wireless communication system that includes at least one base station and one vehicle, according to some embodiments.

In some embodiments, the network may provide the additional RB parameters mentioned above. In addition, as also mentioned above, the network (NW) may provide a limited SLRB configuration that complements (or couples with) the LCID configuration in the opposite direction in a bidirectional SLRB setup (e.g. from UE2 to UE1 when UE1 selects the LCID configuration). In some embodiments, the network may provide separate respective configurations for UM and AM. FIG. 11 shows an exemplary wireless communication system in which a base station 1102 transmits SIB and/or dedicated RRC signaling to device (e.g. vehicle) 1104. As noted above, the LCIDs are not configured by the network, but normal and limited SLRB configurations may be provided by base station 1102. In some embodiments, the limited SLRB configurations may be merged with the normal configuration, for example in an ASN.1 design. The additional SLRB configuration provided by the network, e.g. via SIB or dedicated RRC signaling, is referred to herein as "coupling" SLRB configuration, while the configuration of other additional RB parameters is referred to as "normal" SLRB configuration. For example, maxCID, mapped QoS Flow, and PDCP SN size may be considered part of a "normal" SLRB configuration, while RLC SN length and LCH priority may be considered part of the "coupling" SLRB configuration. Both of these configurations may be provided by the network/base station, for example to the initiating UE (e.g. UE1), and in the case of the coupling SLRB configuration also to the peer UE (e.g. UE2), while the initiating UE is responsible for selecting/determining the LCID, SLRB ID, and UM/AM.

According to the above, for dynamic LCID selection, a first step of a setup procedure may include an initiating UE (e.g. UE1) obtaining a first set (e.g. "normal") and a second set (e.g. "coupling") SLRB configurations from a base station as shown in FIG. 11. These configurations, however, do not include LCID or SLRB ID, which are chosen/selected by the initiating UE. Subsequent steps may be performed according to at least two different options.

Figure 12:
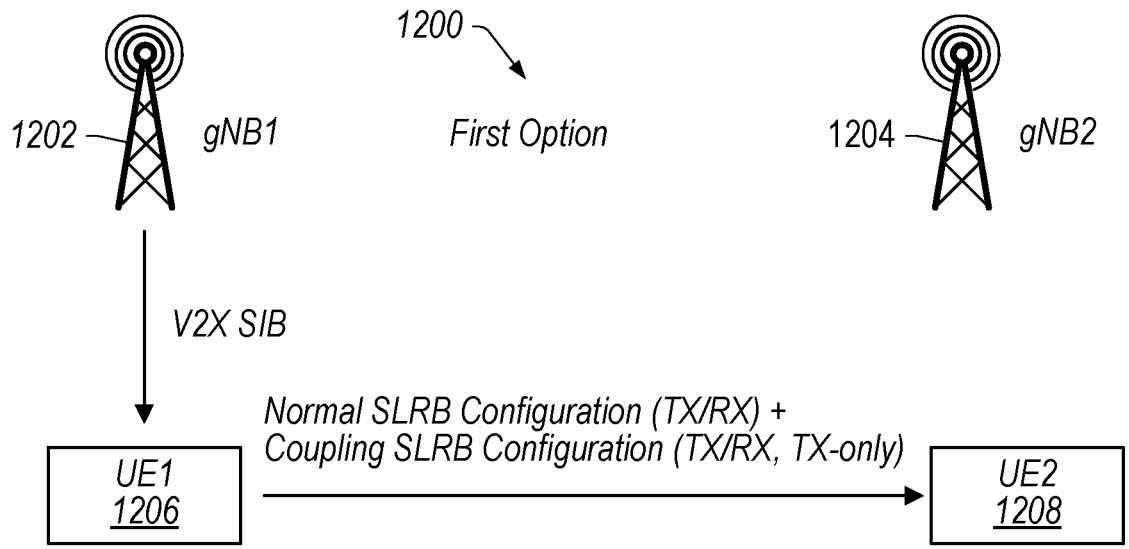
FIG. 12 shows an exemplary wireless communication system in which an initiating UE configures a second UE via PC5-RRC (sidelink radio resource control) signaling, according to some embodiments.

According to a first option, a Uu design may be implemented, where the initiating device (e.g. UE1) may configure UE2 via PC5-RRC. This is illustrated in system 1200 of FIG. 12. UE1 1206 is served by base station 1202 while UE2 1208 is served by base station 1204. As illustrated, UE1 1206 may receive V2X system information block (SIB) from base station 1202. At step 2, UE1 1206 may choose/determine the LCID for the SLRB configuration, then provide the RLC configuration for both directions (UE1→UE2 and UE2→UE1) for both data and the feedback information (e.g. SR) to UE2 1208. Thus, both the normal SLRB configurations for TX/RX, and also the coupling SLRB configurations for both TX/RX and TX-only are provided by UE1 1206 to UE2 1208. At a third step, UE2 1208 may acknowledge the configurations received from UE1 1206, and use the coupling SLRB parameters to implement RLC transmissions.

Figure 13:
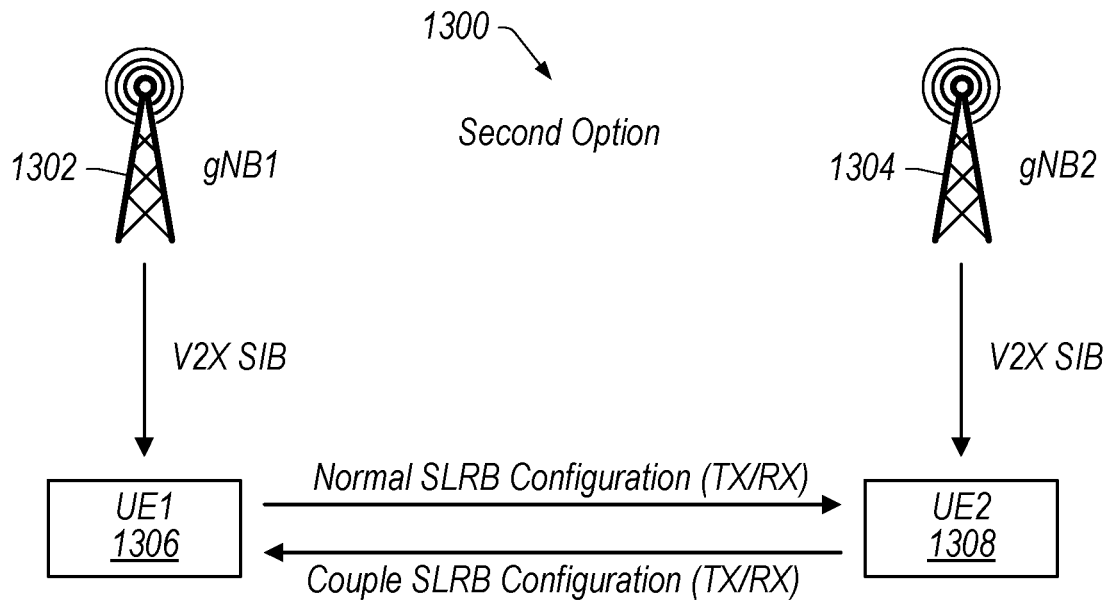
FIG. 13 shows an exemplary wireless communication system in which each UE is configured by its own serving base station, according to some embodiments.

According to a second option, the peer UE (UE2) may be partially configured by its own serving base station. This is illustrated in system 1300 of FIG. 13. UE1 1306 is served by base station 1302 while UE2 1308 is served by base station 1304. As illustrated, UE1 1306 may receive V2X system SIB from base station 1302, and UE2 1308 may receive V2X system SIB from base station 1304. At step 2, UE1 1306 may choose/determine the LCID for the SLRB configuration, then provide the RLC configuration for one direction only (UE1→UE2) for data to UE2 1208. Thus, only the normal SLRB configurations for TX/RX are provided by UE1 1306 to UE2 1308 through PC5-RRC. At step 3, UE2 1308 implements its own RLC transmission based on the coupling configuration information received from base station 1304, and transmits back the coupling SLRB configuration (for UE2→UE1 feedback information such as SR or ROHC feedback) to UE1 1306.

SITN Problem

As previously mentioned, a bidirectional LCID may be prone to an SITN problem, e.g. when two UEs attempt to establish and setup bidirectional SLRBs with each other, using the same LCID, but with incompatible parameters. That is, a SITN problem may occur when each UE (e.g. of a pair of UEs) is initiating the setup procedure with the other UE at the same time. This problem may be addressed in a number of ways.

According to a first option, the issue may simply ignored, which may not happen frequently and is not preferable. According to a second option, the UE may deal with the failure selecting a new or same LCID and attempt communication again with a random back-off timer. In this case, following a failure to establish a bearer with the intended LCID, the initiating UE may assume there is a SITN problem, and may select a random timer (e.g. a specified time period or period of time), and try to establish the bearer again after the timer expires. The peer UE may also similarly start a timer or begin a back-off time period during which the UE waits in a similar manner as the initiating UE. Whichever UE's timer expires earlier may initiate the procedure again and the SITN problem may not occur as the other UE's timer may not have expired at the same time. Thus, when each of the UEs uses a back-off timer to control re-initiation of the setup procedure, it is very likely that the respective timers of the UEs will not expire at the same time. Therefore, one of the UEs may initiate the procedure first, reserving the intended LCID. Subsequently, once the peer UE timer (the timer of the other UE) expires, the peer UE may detect that an LCID has already been used by the other UE, and the peer UE may initiate its own procedure using a different LCD. For the retry, the initiating UE may either try the same LCID or propose a new LCID.

According to a third option, the LCID space may be split, and each UE may configure at most half of the LCID space. This ensures that for the peer UE, the corresponding LCID (RB ID) is not configured. For example, the initiating device (e.g. UE1) may only configure odd LCIDs (1, 3, 5 . . . ), and UE2 may configure even LCIDs (2, 4, 6 . . . ). This ensures that there is never a same LCID proposed for both directions (UE1→UE2 and UE2→UE1). The split of the LCID space may be negotiated during PC5-S procedure when a PC5 direct link is setup.

Mode 1 Operation with UE in RRC-Connected State

Two resource allocation modes are specified for sidelink operations. Mode 1 is a network-scheduled mode, while Mode 2 is an autonomous resource selection mode. In Mode 1 all resource allocation is performed by the base station (e.g. gNB), for which the UE has to be in an RRC connected state. For Mode 1 operation the UE may inform the network about the amount of sidelink data that the UE has buffered in the MAC layer, and the network allocates the corresponding sidelink grants. The buffer status report transmitted by the UE includes the logical channel group (LCG) ID. Logical channel groups are used to organize different logical channels into different groups based on QoS requirements. In Mode 2 operation, the UE does not need to report buffer status because the sidelink grant is created by the UE itself based on a specific static resource configuration. Thus, LCH-to-LCG (logical channel to logical group) mapping and LCG ID are not needed and therefore not used in Mode 2 operation.

Considering Mode 1 operation, when a UE in idle mode selects an LCID by itself and a UE in an RRC connected state also selects an LCID by itself, the respective serving base station (network) may not be or may not become aware of the LCID or the SLRB ID. In some embodiments, the base station (e.g. gNB) may remain agnostic of the LCID, similar to Mode 2, while there may still be an LCG associated with SLRB configurations in RRC-reconfiguration but without knowledge of the LCD. If the base station is required to be aware of each LCH, the UE may report the LCH associated with the feedback information, such as SR or ROHC feedback, to the base station via sidelink UE information with a special flag, indicating the intended LCID. The base station may confirm reception of the LCID through the SLRB configuration, and LCH-to-LCG mapping. In case there is no UE2 to UE1 data traffic (UE2→UE1 traffic), the base station may remain agnostic of the LCID for the coupling case. In case there is traffic demand in the UE2→UE1 direction, UE2 may optionally enclose LCID information in a sidelink UE information, and request the base station to configure a full set of SLRB parameters for this existing LCH.

Fixed (Hardcoded) RLC AM Bearer and RLC UM Bearer

Alternatively to a fully dynamic LCID selection, part or all bidirectional RLC AM bearers and RLC UM bearers may be hardcoded. For example, set 1 parameters may be fixed in the 3 GPP 38.331 RRC specification. Other parameters (e.g. QoS Flow to bearer mapping) may be configured by the network (or base station) via RRC. In case the UE still intends to create a bidirectional RB for an LCID that is not fixed, one of the other procedures discussed above (e.g. with respect to dynamic LCID selection) may be used. The fixed LCID may still be used to opportunistically establish a unidirectional RB. This approach provides compatible SLRB parameters (LCID, etc.) by fixing the parameters in the specification.

The LCID space may therefore be split into multiple possible portions, e.g. into three possible portions. A first portion may be fixed in the specification and may primarily be used for bidirectional RBs, also ensuring compatible SLRB parameters among all UEs. A second portion may include LCIDs configured by the network for unidirectional SLRB only, which would not overlap with LCIDs fixed in the specification. A third portion may include the remaining LCIDs which are not part of the first and second portions, and which may be selected by the UE.

Dynamic LCID Selection Vs. Fixed LCID

A comparison of the dynamic LCID selection versus fixed (hardcoded) LCID provides an indication of which approach may be preferable under various different circumstances.

For idle and/or inactive UEs, dynamic LCID selection may always succeed with half-duplex bidirectional RB, and the second option may also be optimized to be used for full duplex bidirectional setup. Considering fixed values, default RBs may be established using parameters fixed in specification. Additional SLRB establishment with non-default parameters may fail due to potential LCID conflicts between LCIDs corresponding to different modes, and further due to potential incompatibility of the fixed parameters with other SLRB parameters.

For connected UEs, dynamic LCID selection may establish fully bidirectional RBs as long as it does not adversely affect the base station, which may reconfigure a new QoS flow to SLRB mapping. In some embodiments, this may be implemented by providing enhancements in the RRC messages transmitted over the Uu interface. For example, RRC message definitions may be updated to account for performing such reconfigurations. Additionally, an LCGID may be reserved for a mode 1 UE transmitting feedback information, such as SR. Considering fixed values, the base station may be asked to override incompatible SLRB configurations by enclosing the LCID.

Advantages of dynamic LCD selection include involvement of the network (e.g. parameters may still be configured by the network/base station). Furthermore, LCID selection is flexible and allows unlimited number of bidirectional SRBs/DRBs to be setup. Advantages of the fixed parameters include the ability to establish full duplex bidirectional RBs in both IDLE and CONNECTED mode UEs. It also solves the SITN problem for LCIDs fixed in the specification. In case both sides (e.g. both UEs) initiate an SLRB establishment, then both procedures may succeed and end result in establishment of a single SLRB having the fixed LCD.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus of a device comprising:
a processor configured to perform operations comprising:
   selecting a first channel identifier (ID) to identify a single bidirectional logical channel corresponding to a bidirectional sidelink radio bearer (SLRB);
   initiating a setup procedure to establish the bidirectional SLRB between the device and a peer device, using the first channel ID;
   starting a timer in response to failing to establish the bidirectional SLRB with the peer device;
   re-initiating the setup procedure upon expiration of the timer to establish the bidirectional SLRB; and
   upon successfully establishing the bidirectional SLRB:
      transmitting data and feedback information to the peer device over the single bidirectional logical channel, wherein the feedback information comprises one or more of status reports or robust header compression feedback; and
      receiving data and feedback information from the peer device over the single bidirectional logical channel.

2. The apparatus of claim 1, wherein re-initiating the setup procedure comprises using one of:
the first channel ID; or
a second channel ID different from the first channel ID.

3. The apparatus of claim 2, the operations further comprising:
using the second channel ID in response to detecting that the first channel ID has already been used by the peer device.

4. The apparatus of claim 1, wherein failing to establish the bidirectional SLRB with the peer device is at least in response to the peer device initiating a second setup procedure to establish the bidirectional SLRB between the peer device and the device at a same time as the processor initiating the setup procedure.

5. The apparatus of claim 4, wherein failing to establish the bidirectional SLRB with the peer device is further in response to the processor and the peer device both using the first channel ID when respectively initiating the setup procedure and the second setup procedure, but respectively using incompatible parameters corresponding to communications conducted over the bidirectional SLRB.

6. The apparatus of claim 1, wherein the setup procedure comprises:
specifying respective values for one or more parameters from a plurality of parameters that include:
   an SLRB identification identifying the bidirectional SLRB; and
   one from among an acknowledged mode and unacknowledged mode; and
   configuring the peer device with the specified values via sidelink radio resource control signaling.

7. The apparatus of claim 1, the operations further comprising:
receiving respective values of at least a subset of a first set of parameters from a serving base station, wherein the first set of parameters correspond to the single bidirectional logical channel.

8. The apparatus of claim 7, the operations further comprising:
upon successfully establishing the bidirectional SLRB:
   transmitting information indicative of the respective values of the at least a subset of the first set of parameters to the peer device to configure the peer device.

9. A device comprising:
radio circuitry configured to enable wireless communications of the device; and
a processor communicatively coupled to the radio circuitry and configured to perform operations comprising:
   selecting a first channel identifier (ID) to identify a single bidirectional logical channel corresponding to a bidirectional sidelink radio bearer (SLRB);
   initiating a setup procedure to establish the bidirectional SLRB between the device and a peer device, using the first channel ID;
   starting a timer in response to failing to establish the bidirectional SLRB with the peer device; re-initiating the setup procedure upon expiration of the timer to establish the bidirectional SLRB; and
   upon successfully establishing the bidirectional SLRB:
      transmitting data and feedback information to the peer device over the single bidirectional logical channel, wherein the feedback information comprises one or more of status reports or robust header compression feedback; and
      receiving data and feedback information from the peer device over the single bidirectional logical channel.

10. The device of claim 9, wherein re-initiating the setup procedure comprises using one of:
the first channel ID; or
a second channel ID different from the first channel ID.

11. The device of claim 10, the operations further comprising:
using the second channel ID in response to detecting that the first channel ID has already been used by the peer device.

12. The device of claim 9, wherein failing to establish the bidirectional SLRB with the peer device is at least in response to the peer device initiating a second setup procedure to establish the bidirectional SLRB between the peer device and the device at a same time as the processor initiating the setup procedure.

13. The device of claim 12, wherein failing to establish the bidirectional SLRB with the peer device is further in response to the processor and the peer device both using the first channel ID when respectively initiating the setup procedure and the second setup procedure, but respectively using incompatible parameters corresponding to communications conducted over the bidirectional SLRB.

14. The device of claim 9, wherein the setup procedure comprises:
- specifying respective values for one or more parameters from a plurality of parameters that include:
  - an SLRB identification identifying the bidirectional SLRB; and
  - one from among an acknowledged mode and unacknowledged mode; and
- configuring the peer device with the specified values via sidelink radio resource control signaling.

15. A non-transitory memory element storing instructions executable by a processor of a device to perform operations comprising:
- selecting a first channel identifier (ID) to identify a single bidirectional logical channel corresponding to a bidirectional sidelink radio bearer (SLRB);
- initiating a setup procedure to establish the bidirectional SLRB between the device and a peer device, using the first channel ID;
- starting a timer in response to failing to establish the bidirectional SLRB with the peer device; re-initiating the setup procedure upon expiration of the timer to establish the bidirectional SLRB; and
- upon successfully establishing the bidirectional SLRB:
  - transmitting data and feedback information to the peer device over the single bidirectional logical channel, wherein the feedback information comprises one or more of status reports or robust header compression feedback; and
  - receiving data and feedback information from the peer device over the single bidirectional logical channel.

16. The non-transitory memory element of claim 15, wherein re-initiating the setup procedure comprises using one of:
- the first channel ID; or
- a second channel ID different from the first channel ID.

17. The non-transitory memory element of claim 16, the operations further comprising:
- using the second channel ID in response to detecting that the first channel ID has already been used by the peer device.

18. The non-transitory memory element of claim 15, wherein failing to establish the bidirectional SLRB with the peer device is at least in response to the peer device initiating a second setup procedure to establish the bidirectional SLRB between the peer device and the device at a same time as the processor initiating the setup procedure.

19. The non-transitory memory element of claim 18, wherein failing to establish the bidirectional SLRB with the peer device is further in response to the processor and the peer device both using the first channel ID when respectively initiating the setup procedure and the second setup procedure, but respectively using incompatible parameters corresponding to communications conducted over the bidirectional SLRB.

20. The non-transitory memory element of claim 15, wherein the setup procedure comprises:
- specifying respective values for one or more parameters from a plurality of parameters that include:
  - an SLRB identification identifying the bidirectional SLRB; and
  - one from among an acknowledged mode and unacknowledged mode; and
- configuring the peer device with the specified values via sidelink radio resource control signaling.

* * * * *